(12) United States Patent
Maxey

(10) Patent No.: US 9,052,452 B2
(45) Date of Patent: Jun. 9, 2015

(54) SOLAR CONCENTRATOR WITH INTEGRATED TRACKING AND LIGHT DELIVERY SYSTEM WITH COLLIMATION

(71) Applicant: UT-Battelle, LLC, Oak Ridge, TN (US)

(72) Inventor: Lonnie Curt Maxey, Powell, TN (US)

(73) Assignee: UT-Batelle, LLC, Oak Ridge, TN (US)

( * ) Notice: Subject to any disclaimer, the term of this patent is extended or adjusted under 35 U.S.C. 154(b) by 0 days.

(21) Appl. No.: 14/100,063

(22) Filed: Dec. 9, 2013

(65) Prior Publication Data

US 2015/0070776 A1 Mar. 12, 2015

Related U.S. Application Data

(60) Provisional application No. 61/875,258, filed on Sep. 9, 2013.

(51) Int. Cl.
| | | |
|---|---|---|
| G02B 5/10 | (2006.01) | |
| G02B 27/30 | (2006.01) | |
| G02B 7/183 | (2006.01) | |

(52) U.S. Cl.
CPC .............. G02B 7/183 (2013.01); G02B 27/30 (2013.01); *Y02B 10/20* (2013.01)

(58) Field of Classification Search
CPC ......... G02B 27/30; Y02E 10/47; Y02B 10/20
USPC .......... 359/629, 641, 851–853; 126/573, 621, 126/623, 683, 684
See application file for complete search history.

(56) References Cited

U.S. PATENT DOCUMENTS

| | | | |
|---|---|---|---|
| 4,249,516 | A | 2/1981 | Stark |
| 4,740,048 | A | 4/1988 | Mori |
| 6,178,707 | B1 | 1/2001 | Bengtson |
| 6,341,041 | B1 | 1/2002 | Carlson |
| 6,818,818 | B2 | 11/2004 | Bareis |
| 7,231,128 | B2 | 6/2007 | Muhs et al. |
| 7,973,235 | B2 | 7/2011 | Muhs et al. |
| 8,184,372 | B1 | 5/2012 | Gu |
| 8,371,078 | B2 | 2/2013 | Jaster |
| 8,631,787 | B2 | 1/2014 | Benitez et al. |
| 8,902,505 | B2 | 12/2014 | Scott et al. |

(Continued)

FOREIGN PATENT DOCUMENTS

| | | |
|---|---|---|
| WO | 2004/029521 | 4/2004 |
| WO | 2007/058834 | 5/2007 |

(Continued)

*Primary Examiner* — William Choi
(74) *Attorney, Agent, or Firm* — Colin L. Cini

(57) ABSTRACT

A solar light distribution system includes a solar light concentrator that is affixed externally to a light transfer tube. Solar light waves are processed by the concentrator into a collimated beam of light, which is then transferred through a light receiving port and into the light transfer tube. A reflector directs the collimated beam of light through the tube to a light distribution port. The interior surface of the light transfer tube is highly reflective so that the light transfers through the tube with minimal losses. An interchangeable luminaire is attached to the light distribution port and distributes light inside of a structure. A sun tracking device rotates the concentrator and the light transfer tube to optimize the receiving of solar light by the concentrator throughout the day. The system provides interior lighting, uses only renewable energy sources, and releases no carbon dioxide emissions into the atmosphere.

27 Claims, 13 Drawing Sheets

(56) References Cited

U.S. PATENT DOCUMENTS

| | | |
|---|---|---|
| 2002/0085393 A1* | 7/2002 | Eisenman et al. ............ 362/576 |
| 2006/0174867 A1 | 8/2006 | Schaafsma |
| 2007/0221209 A1 | 9/2007 | Neubauer et al. |
| 2008/0000516 A1 | 1/2008 | Shifman |
| 2008/0092877 A1 | 4/2008 | Monsebroten |
| 2008/0184989 A1 | 8/2008 | Mecham |
| 2009/0032085 A1 | 2/2009 | Grumazescu |
| 2009/0277496 A1 | 11/2009 | Khazeni et al. |
| 2010/0059045 A1* | 3/2010 | Guinea Diaz et al. ........ 126/601 |
| 2010/0147287 A1 | 6/2010 | Darmstadt |
| 2011/0000543 A1 | 1/2011 | Errico |
| 2011/0083721 A1 | 4/2011 | Imani |
| 2011/0114078 A1 | 5/2011 | Fargo |
| 2011/0168164 A1 | 7/2011 | Zillmer et al. |
| 2012/0080161 A1 | 4/2012 | Kelly |
| 2014/0126063 A1 | 5/2014 | Whang et al. |
| 2014/0133041 A1 | 5/2014 | Maxey |

FOREIGN PATENT DOCUMENTS

| | | |
|---|---|---|
| WO | 2011127572 | 10/2011 |
| WO | 2012/032462 | 3/2012 |

\* cited by examiner

SOLAR CONCENTRATOR WITH INTEGRATED TRACKING AND LIGHT DELIVERY SYSTEM WITH COLLIMATION

CROSS-REFERENCE TO RELATED APPLICATIONS

This application claims priority under 35 U.S.C. §119 to U.S. provisional patent application Ser. No. 61/875,258 filed Sep. 9, 2013, which is hereby incorporated by reference in its entirety.

This application relates to U.S. patent application Ser. No. 14/100,069, filed on 9 Dec. 2013 and entitled, "Solar Concentrator with Integrated Tracking and Light Delivery System with Summation."

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

THE NAMES OF THE PARTIES TO A JOINT RESEARCH AGREEMENT

None.

BACKGROUND OF THE INVENTION

1. Field of the Invention

The present disclosure relates to solar lighting systems and more specifically to systems and methods for collecting solar light and distributing the light to the interior of a structure.

2. Description of the Related Art

The Department of Defense (DoD) is the single largest consumer of energy in the world and currently spends approximately $20B a year on energy. The John Warner National Defense Authorization Act of 2007 states that in the year 2025, 25% of all energy consumed at the DoD will be from renewable sources. In order to meet the goal, the DoD has ambitious plans to increase its use of renewables.

Since 2001, many forward operating bases have been located in arid areas with ample sunlight, which can be used for generating electricity and purifying water. Since tents, halls, depots, hangers, and other structures require interior lighting to enable personnel to support the DoD's missions, alternatives to conventional lighting should be considered.

U.S. Pat. No. 7,973,235 "Hybrid Solar Lighting Distribution Systems and Components" and U.S. Pat. No. 7,231,128 "Hybrid Solar Lighting Systems and Components" each describe the use of a solar concentrator for collecting sunlight, a fiber receiver for transferring the sunlight, and a hybrid luminaire for distributing the sunlight. U.S. patent application Ser. No. 13/646,781 "Modular Off-Axis Fiber Optic Solar Concentrator" describes a modular solar concentrator having a primary reflector with a reflecting surface that is a segment of a parent paraboloid. U.S. Pat. No. 8,371,078 "Sunlight Collection System and Apparatus" describes a hollow shaft and roof-mounted cover for distributing solar light through a roof and into the interior of a structure.

Despite the teachings noted above, improvements to solar lighting systems are necessary to reduce dependency on fossil fuels and transition to renewable energy resources while meeting renewable energy goals.

BRIEF SUMMARY OF THE INVENTION

Disclosed are several examples of systems, apparatuses, and methods for distributing solar light inside of structures. Once installed, the systems provide lighting that does not require the use of fossil fuels and releases no carbon dioxide into the atmosphere.

According to one example, a solar light distribution system includes a first tubular member extending lengthwise along a central, longitudinal axis (CL1), the first tubular member having a first support wall defining a first light transfer duct, a first light receiving port, and a first light delivery port that are optically coupled. Also included is a solar light concentrator affixed externally to the first tubular member and located proximate to the first light receiving port, the light concentrator for receiving solar light waves, processing the solar light waves into a collimated light beam, and directing the collimated light beam through the first light receiving port and into the first light transfer duct. Also included is a first turning reflector disposed inside of the first light transfer duct and located proximate to the first light receiving port, the first turning reflector for reflecting the collimated light beam from the light receiving port, down the first light transfer duct, approximately parallel to the central, longitudinal axis (CL1), to the first light delivery port.

According to another example, a solar light distribution system includes a first tubular member extending lengthwise along a central, longitudinal axis (CL1), the first tubular member having a first support wall defining a first light transfer duct, a first light receiving port, and a first light delivery port that are optically coupled. Also included is a solar light concentrator affixed externally to the first tubular member and located proximate to the first light receiving port, the light concentrator for receiving solar light waves, processing the solar light waves into a collimated light beam, and directing the collimated light beam through the first light receiving port and into the first light transfer duct. Also included is a first turning reflector disposed inside the first light transfer duct and located proximate to the first light receiving port, the first turning reflector for reflecting the collimated light beam from the light receiving port, down the first light transfer duct, approximately parallel to the central, longitudinal axis (CL1), to the first light delivery port. Also included is a second tubular member extending lengthwise along a central, longitudinal, axis (CL2), the second tubular member having a second support wall defining a second light transfer duct, a second light receiving port, and a second light delivery port that are optically coupled, the second tubular member at the second light receiving port being connected at a juncture to the first tubular member at the first light delivery port. Also included is a second turning reflector disposed proximate to the juncture of the second tubular member and the first tubular member, the second turning reflector for reflecting the collimated light beam from the second light receiving port, down the second light transfer duct and approximately parallel to the central, longitudinal axis (CL2), to the second light delivery port.

According to another example, a method of distributing solar light to a structure includes: a) receiving solar light with a concentrator affixed externally to a first tubular member extending lengthwise along a central, longitudinal axis (CL1); b) processing the solar light into a collimated light beam with the concentrator; c) directing the collimated light beam through a first light receiving port and into a first light transfer duct defined by the first tubular member; and d) reflecting the collimated light beam with a first turning reflector disposed in the first internal light duct and proximate to the first light receiving port, down the first light transfer duct, approximately parallel to the central, longitudinal axis (CL1) to a first light delivery port.

BRIEF DESCRIPTION OF THE SEVERAL VIEWS OF THE DRAWINGS

The systems and methods may be better understood with reference to the following drawings and detailed description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF THE INVENTION

Figure 1:
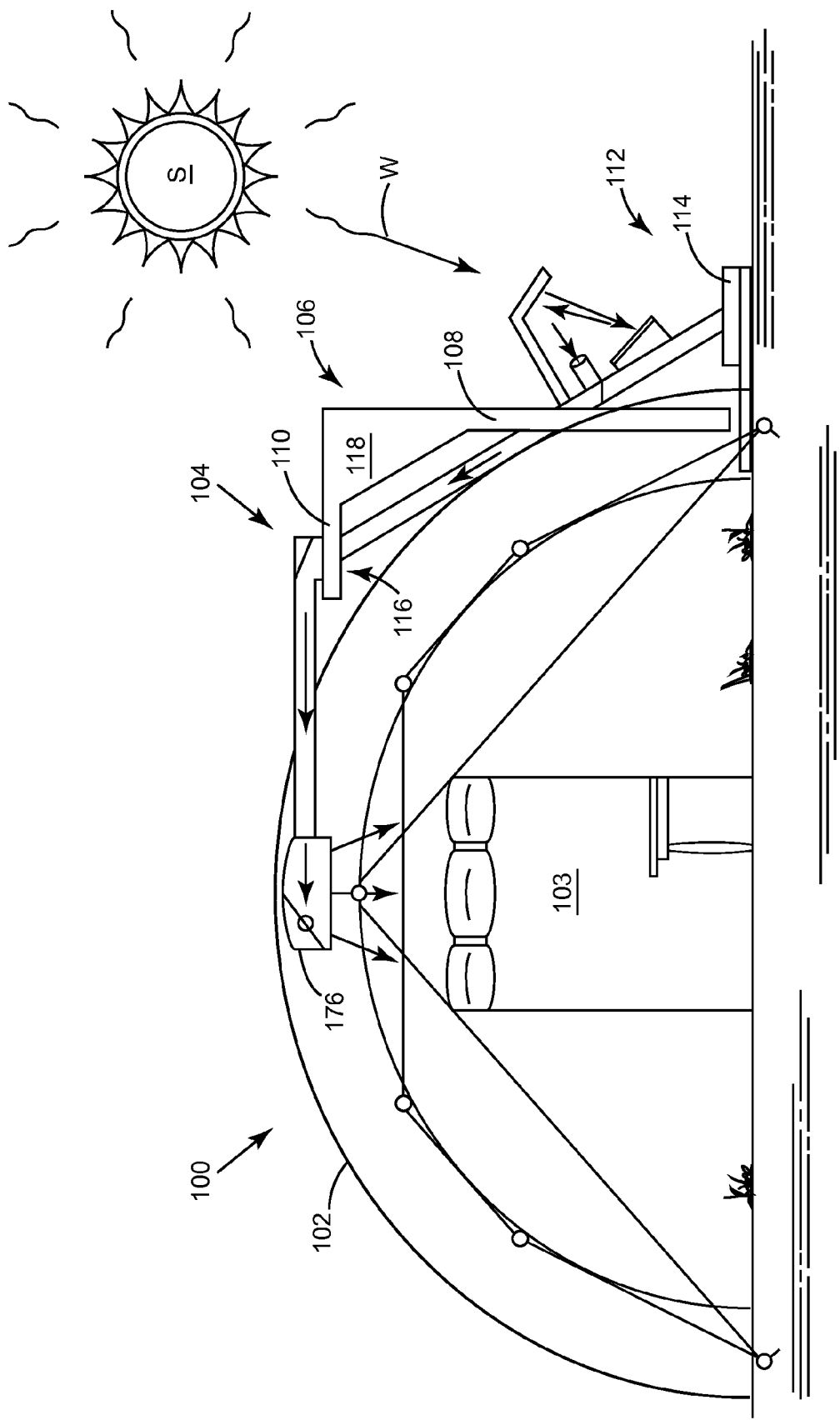
FIG. 1 is an example of a solar light delivery system installed on a temporary structure.
Figure 2:
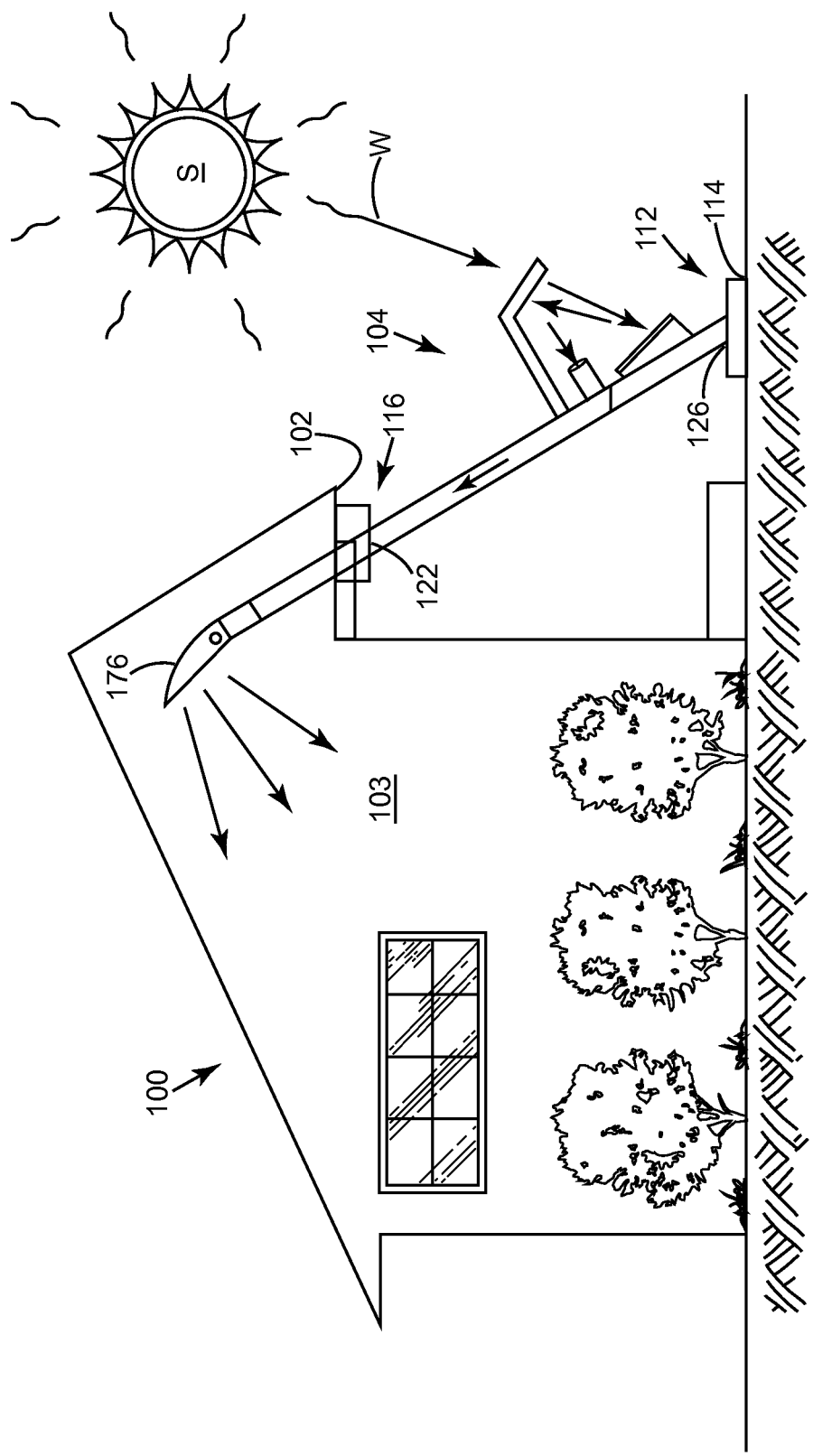
FIG. 2 is an example of a solar light delivery system installed on a permanent structure.

With reference first to FIGS. 1 and 2, a temporary or permanent structure 100, such as a tent, Quonset hut, home, office, shower house, warehouse, or the like, includes an exterior wall 102 that defines an interior volume 103. The structure 100 is preferably sited and designed such that at least a portion of an exterior wall 102 has a line-of-sight to the sun (S) during a portion of the day. In the Northern hemisphere, a South-facing wall is preferred and in the southern hemisphere a North-facing wall is preferred. Solar light waves (W) coming from the sun (S) are generally collected from the outside of the structure 100 and delivered into the interior volume 103 by a solar lighting system 104, which will now be described in greater detail.

A rigid support member 106 includes a vertical pier 108 and a horizontal arm 110. A lower end 112 of the vertical pier 108 is secured to a surface adjacent to the structure 100, or to the structure itself, with an anchoring means 114 such as a concrete footing, a base plate and sand bags, bolts, screws, stakes, spade blades, or other anchoring means. The horizontal arm 110 is affixed to, and extends from, the vertical pier 108 at an upper end 116. A gusset 118 may be used to strengthen the joint between the horizontal arm 110 and the vertical pier 108. The gusset 118 may also define a hollow cavity 120 for housing other components of the apparatus and those will be discussed later. The rigid support member 106 can be made from concrete, aluminum or steel tubing, wood, composites, or other rigid support materials for example.

A top rotational means 122 supports and positions a first tubular member 124 beside the structure 100. A bottom rotational means 126 also supports and positions the first tubular member 124 such that it will rotate about a central, longitudinally-extending, axis (CL1). Each of the rotational means 122, 126 may include ball-type bearings, roller-type bearings, bushings, sleeves, or other rotational means known in the art or combinations thereof.

Figure 3:
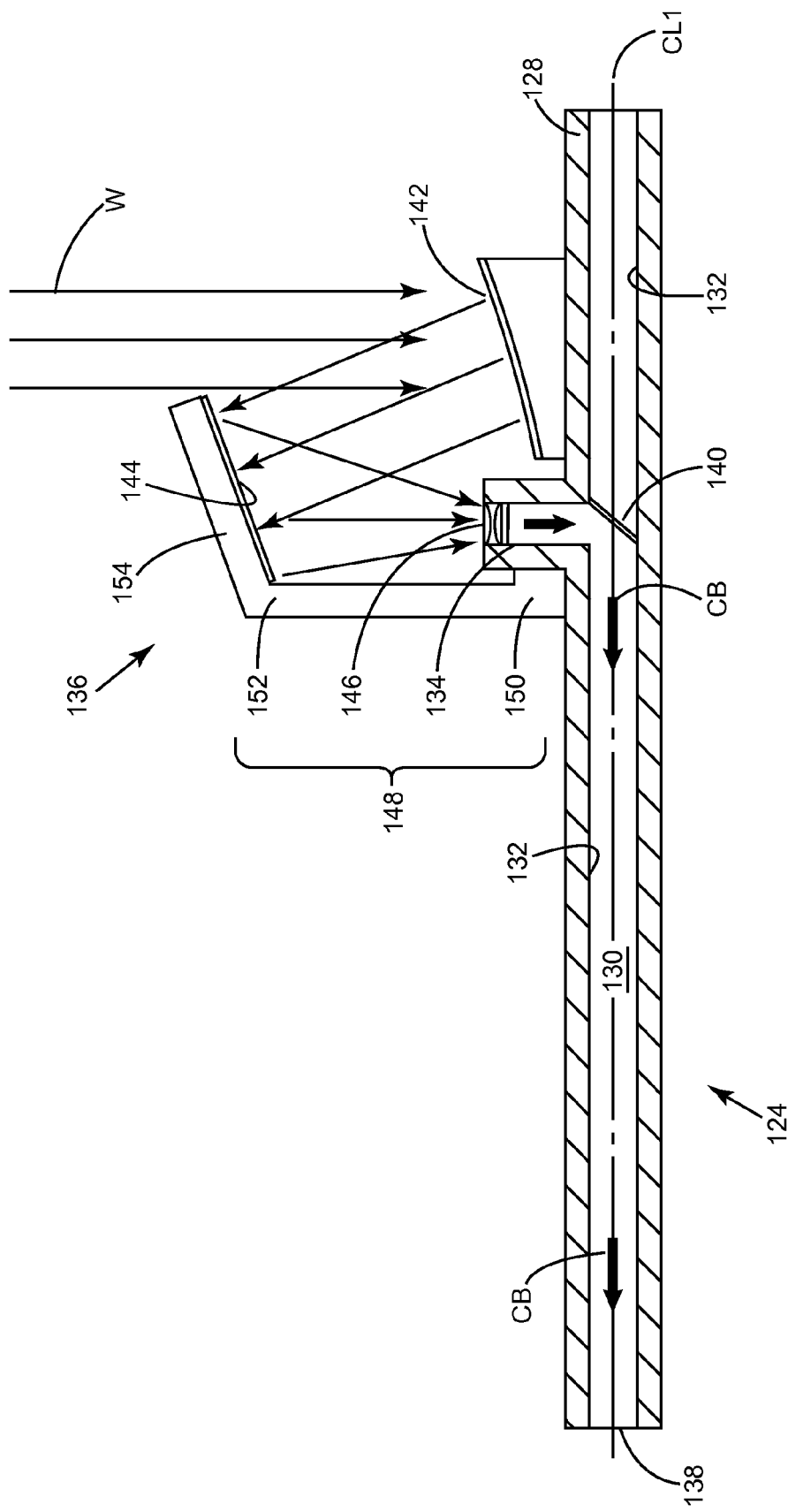
FIG. 3 is a partial sectional view of an example of a first tubular member in accordance with the solar light delivery systems of FIGS. 1 and 2.

As further illustrated in FIG. 3, the first tubular member 124 includes a first support wall 128 that defines a first light transfer duct 130. The first light transfer duct 130 preferably has a circular cross sectional shape for improved reflectance of a collimated beam of light (CB); however, other shapes such as oval, or polygonal, or even other shapes may be used for example. A circular cross sectional shape (e.g., tube or pipe) is preferred for its low-cost, commodity pricing and ease of manufacture. In some examples, the tube or pipe is seamless and in other examples, the tube or pipe is joined at one or more seams. The first support wall 128 has an inner surface 132 that is highly reflective to visible light waves. In some examples, the inner surface 132 is a polished metal surface. In other examples, it is a reflective coated or painted surface. In yet other examples, it is a surface lined with a sheet product such as Micro-Silver manufactured by ALANOD GmbH & Co. KG, which has a reflectivity of approximately 98%.

The first support wall 128 also defines at least two apertures that are optically coupled to the first light transfer duct 130. A first light receiving port 134 receives collimated light from a solar light concentrator 136, and a first light delivery port 138 receives collimated light from the first light transfer duct 130. Although only a single light receiving port 134 and a single light delivery port 138 are illustrated in the figures, two or more of each port are also contemplated in other examples and configurations. The term optically coupled refers to the arrangement of features that allows the transfer of light waves using various techniques known in the art of optics. In general, two features are optically coupled if light waves can be transferred between the two, either directly, or through the use of optic devices, such as lenses and reflectors.

A first turning reflector 140 is disposed inside of the first light transfer duct 130 and is located proximate to the first light receiving port 134. The first turning reflector 140 is mounted to the first tubular member 124 rigidly or adjustably to allow for angular adjustments with respect to the central, longitudinal axis (CL1). The first turning reflector 140 receives the collimated beam of light (CB) through the first light receiving port 134 and directs the collimated beam of light (CB) down the first light transfer duct 130 and approximately parallel to the central, longitudinal axis (CL1). The collimated beam of light (CB) travels the length of the first light transfer duct 130 to the first light delivery port 138. The first turning reflector 140 includes a reflective surface that is highly reflective to light. In this example, the first turning reflector 140 is a mirror. In other examples, the first turning reflector 140 is a polished metal surface. In other examples, the first turning reflector 140 is coated with a reflective coating. In yet other examples, the first turning reflector 140 is laminated with a coated sheet product such as Micro-Silver manufactured by ALANOD GmbH & Co. KG, which has a reflectivity of 98%.

Figure 4:
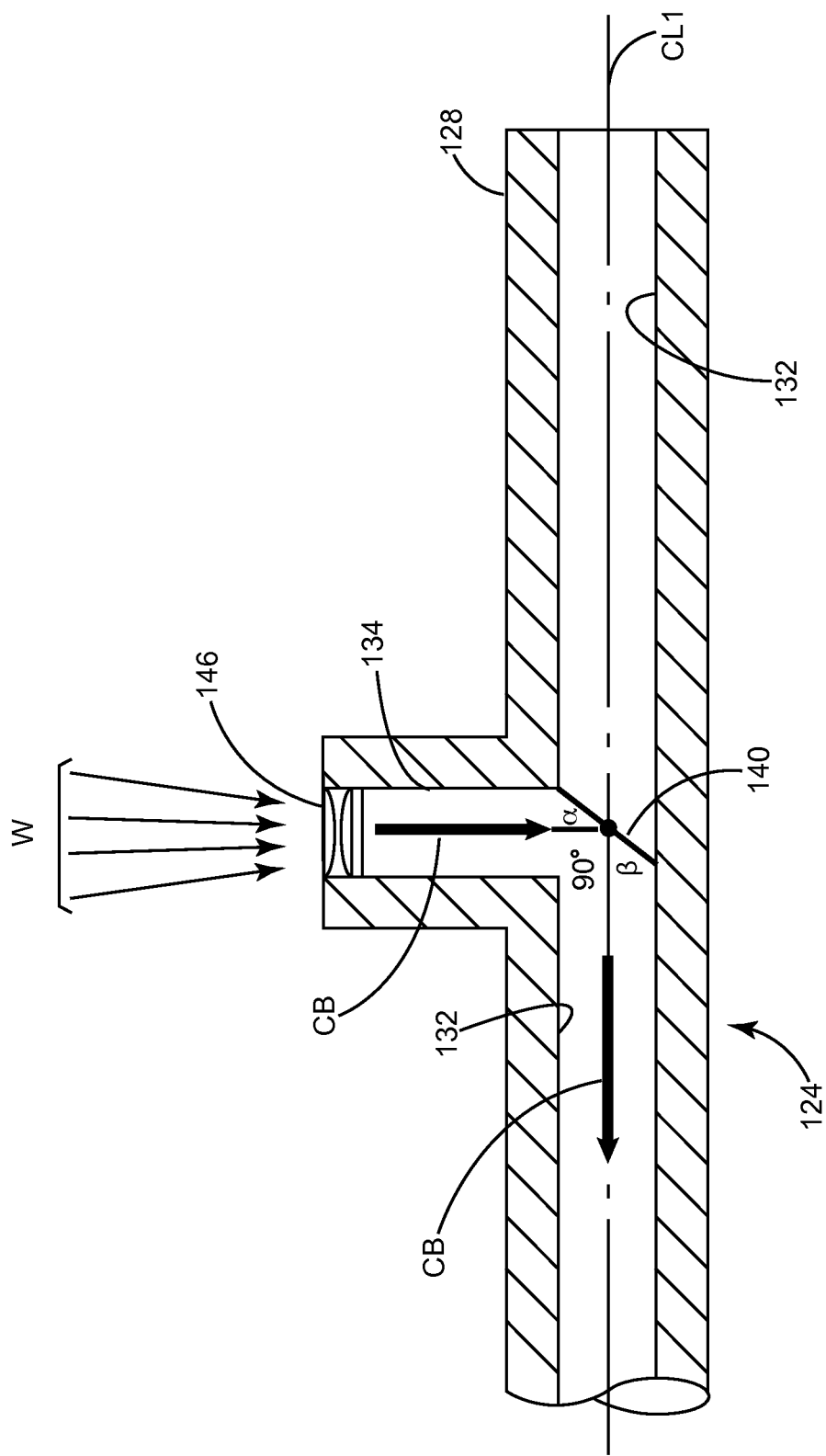
FIG. 4 is a partial sectional view of an example of a first tubular member for accepting a solar concentrator at an angle of approximately 90 degrees.

In one example of FIG. 4, the collimated beam of light (CB) is directed into the first light transfer duct 130 at an approximately 90 degree angle to the central, longitudinal axis (CL1). The law of reflection states that the angle of incidence equals the angle of reflectance. In this example, the first turning reflector 140 is positioned at an angle α of approximately 45 degrees to the incoming collimated beam of light (CB) and at an angle β of approximately 45 degrees to the central, longitudinal axis (CL1).

Figure 5:
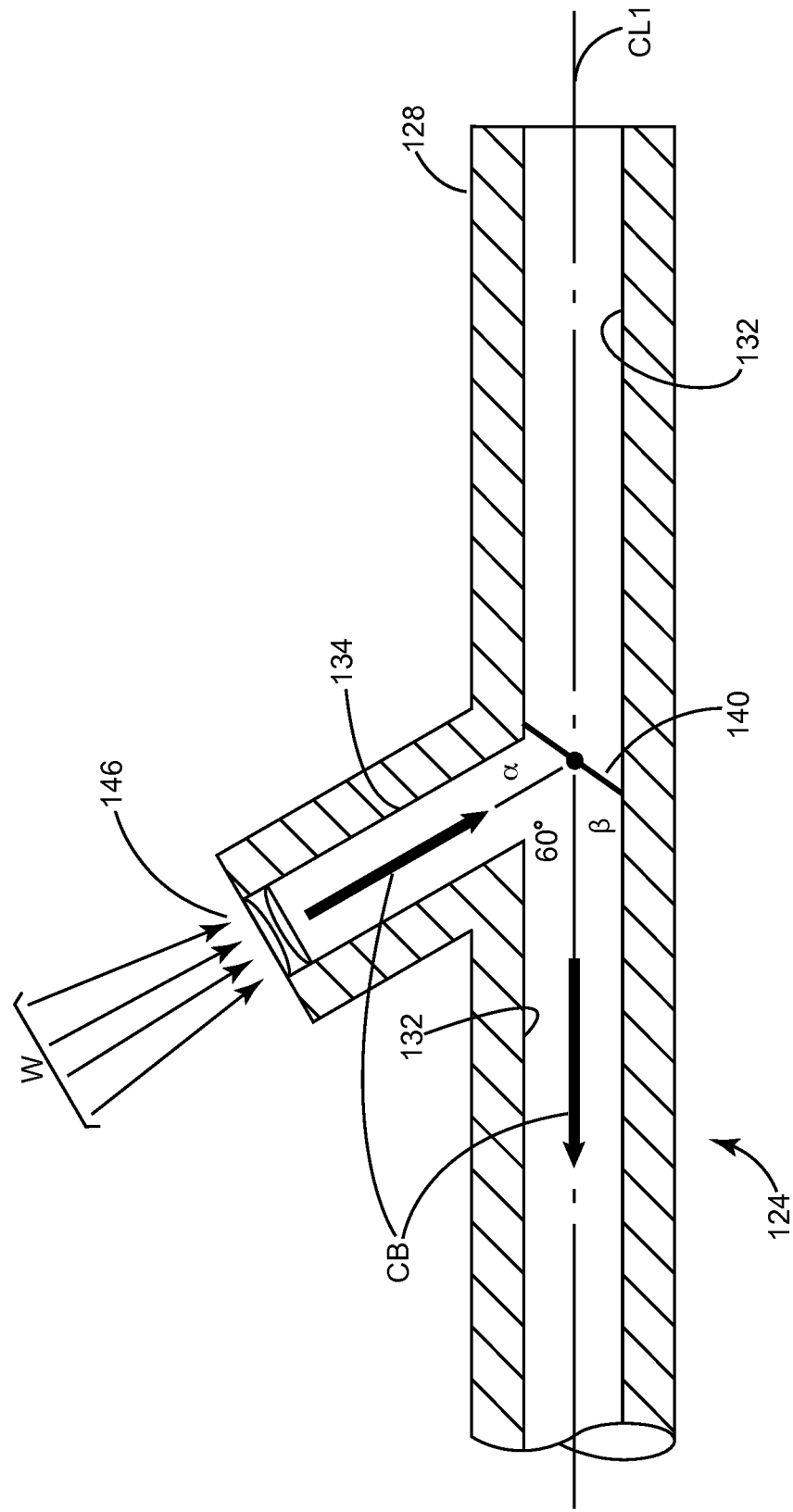
FIG. 5 is a partial sectional view an example of a first tubular member for accepting a solar concentrator at an angle of approximately 60 degrees.

In another example of FIG. 5, the collimated beam of light (CB) is directed into the first light transfer duct 130 at an approximately 60 degree angle to the central, longitudinal axis (CL1). In this example, the first turning reflector 140 is positioned at an angle α of approximately 60 degrees to the incoming collimated beam of light (CB) and at an angle β of approximately 60 degrees to the central, longitudinal axis (CL1).

Figure 6:
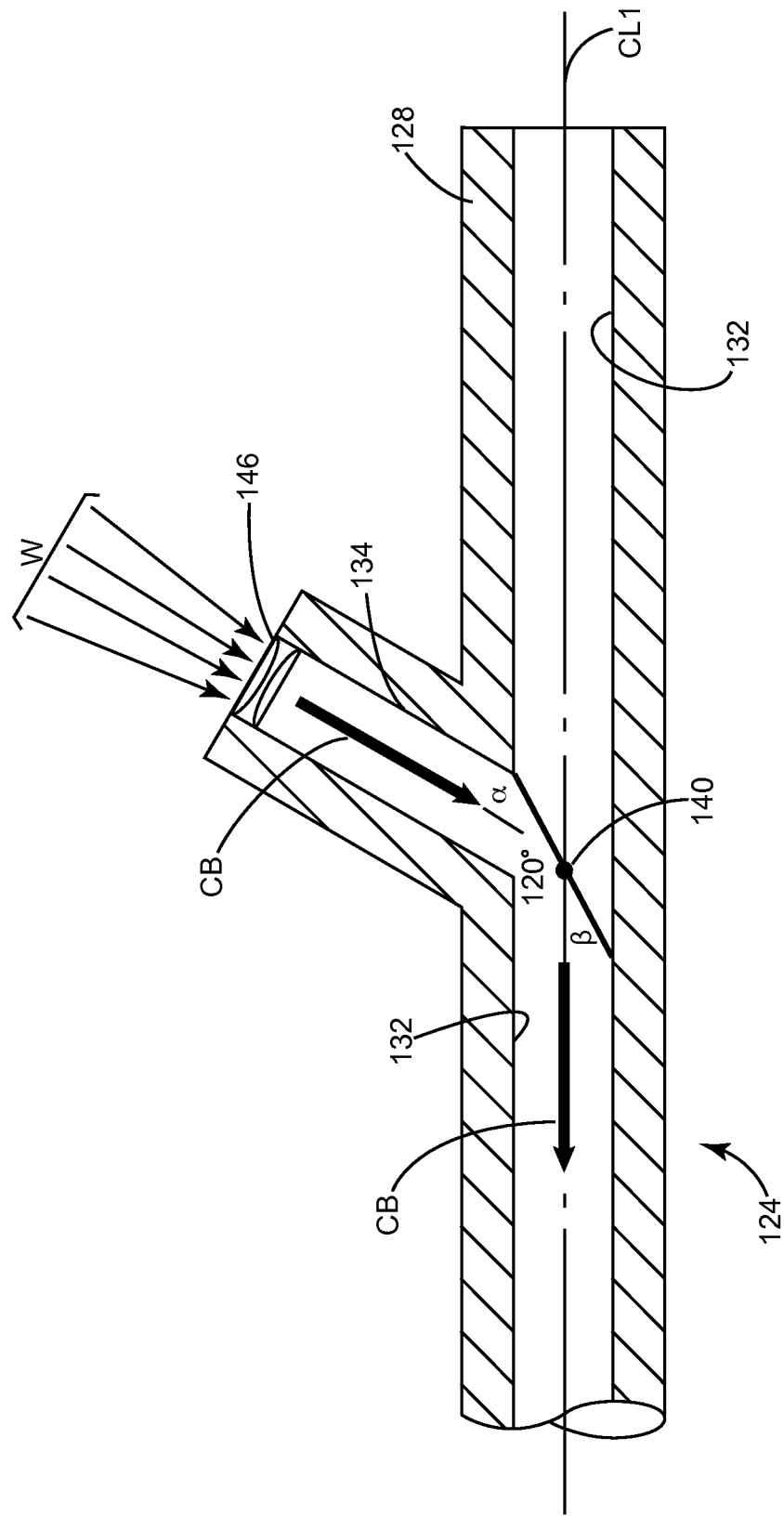
FIG. 6 is an partial sectional view of an example of a first tubular member for accepting a solar concentrator at an angle of approximately 120 degrees.

In yet another example of FIG. 6, the collimated light is directed into the first light transfer duct 130 at an approximately 120 degree angle to the central, longitudinal axis (CL1). In this example, the first turning reflector 140 is positioned at an angle α of approximately 30 degrees to the incoming collimated light beam (CB) and at an angle β of approximately 30 degrees to the central, longitudinal axis (CL1). With these and other angular configurations available, the solar lighting apparatus 104 can be adapted to deliver solar light to many different shapes, sizes and styles of structures 100.

Referring back to FIG. 3, the solar light concentrator 136 generally includes a primary reflector 142, a secondary reflector 144 and a collimating lens 146. U.S. patent application Ser. No. 13/646,781 "Modular Off-Axis Fiber Optic Solar Concentrator" describes an exemplary solar light concentrator 136 and the application is incorporated herein by reference as if included at length. In operation, the primary reflector 142 reflects ambient solar light waves (W) onto the secondary reflector 144 and the secondary reflector 144, in turn, reflects that light through the collimating lens 146 to create a collimated beam of light (CB). In this embodiment, the primary reflector 142 is an aspherical reflector that is a segment of a circular parabolic mirror. The primary reflector 142 is an off-axis segment having an optical axis that is generally aligned and centered along an edge of the primary reflector 142. The secondary reflector 144 may be located at or near the optical axis and be oriented to reflect light waves into the collimating lens 146. In this embodiment, the primary reflector 142 has a peripheral shape that is generally rectilinear. For example, the shape of the periphery of the primary reflector 142 may be square or rectangular.

Although the reflecting surface of the primary reflector 142 of this embodiment is a paraboloid, the present invention may be implemented with a primary reflector having a reflective surface of alternative geometries, including alternative aspheric shapes. The primary reflector 142 may be essentially any type of reflective surface or mirror, with the specific construction being selected to provide an appropriate balance between a variety of factors, such as cost, efficiency and durability. In one embodiment, the primary reflector 142 may be manufactured by applying a reflective coating to a suitable substrate. For example, a reflective coating may be applied to the back surface (i.e. the surface opposite the sun) of a transparent substrate, such as glass or a polycarbonate or other transparent polymeric material. In such embodiments, the front surface (i.e. the surface facing the sun) of the substrate may include an anti-reflective coating. The reflective coating may be covered by one or more protective coatings, if desired. In another example, the reflective coating may be applied to the front surface of a substrate, such as a metal substrate. With either example, the reflective coating may be essentially any suitable reflective coating, such as a thin layer of silver, aluminum or other sufficiently-reflective material. As an alternative, the reflective coating may be a dielectric coating. The dielectric coating may include a variety of different material deposited in thin layers onto the substrate. In an alternative embodiment, the primary reflector 142 may have a highly polished front surface, such as a polished aluminum surface.

The secondary reflector 144 is a mirror oriented to reflect converging sunlight received from the primary reflector 142 into the collimating lens 146. Although shown as a planar mirror, the shape of the secondary reflector 144 may vary from application to application. For example, the secondary reflector 144 may be shaped as a focusing element configured to assist in maximizing the amount of sunlight received from the primary reflector 142 that enters into the collimating lens 146. As with the primary reflector 142, the secondary reflector 144 may be essentially any type of reflector, with the specific construction being selected to provide an appropriate balance between a variety of factors, such as cost, efficiency and durability. The secondary reflector 144 may be manufactured using the various materials and techniques described above in accordance with the primary reflector 142. The secondary reflector 144 may also be designed to selectively remove unwanted wavelengths of light (e.g. ultraviolet and infrared).

The solar light that is reflected by the secondary reflector 144 enters the collimating lens 146 that is disposed adjacent to the first light receiving port 134. The collimating lens 146 processes the incoming solar light that is reflected by the secondary reflector 144 and generates a collimated beam of light (CB). The lens may be negative or positive, simple or complex, provided that it is aligned properly to collimate the light from the focus. In order to achieve this, the focal point of the collimating lens 146 should be coincident with the focal point of the primary reflector 142 (the off-axis parabolic). A negative achromat is used so that the light will be well collimated with little wavefront of chromatic aberration. The use of alternate lens options may result in greater aberrations without substantially affecting the usefulness of the system; however, a highly collimated beam lends itself to subsequent refocusing and redirection much more readily than a less collimated beam.

In the illustrated examples, the primary reflector 142, secondary reflector 144 and collimating lens 146 are held in relative position to one another by a support assembly 148. The support assembly 148 includes a base 150, a support 152 and an arm 154. The base 150 of this example is joined to the first tubular member 124 and disposed at or adjacent to, the first light receiving port 134. The base 150 may be welded, clamped, bolted or otherwise secured to the first tubular member 124. In some examples, the base 150 is an integral part of the first tubular member 124. The support 152 extends from the base 150 in a direction substantially parallel to the optical axis of the primary reflector 142. The support assembly 148 also suspends an arm 154 for holding the secondary reflector 144 in the proper position and orientation. In some examples, the support and arm are rigidly fixed together and in other examples, they are adjustable for angle and length. The support assembly 148 illustrated in the figures is merely one example and other, rigid, light-weight structures are also contemplated.

The above described solar light concentrator 136 is but one example of a device for receiving solar light that may be used for this application. In some examples, an off-axis parabolic mirror of approximately 30 degrees off axis angle is used. In other examples, an off-axis parabolic mirror of less than approximately 30 degrees off axis angle is used. In other examples, an off-axis parabolic mirror of greater than approximately 30 degrees off axis angle is used. In other examples, a full, on-axis parabolic mirror is used. In yet another example, the solar light concentrator 136 is a Fresnel lens or other light concentrating lens.

Figure 7:
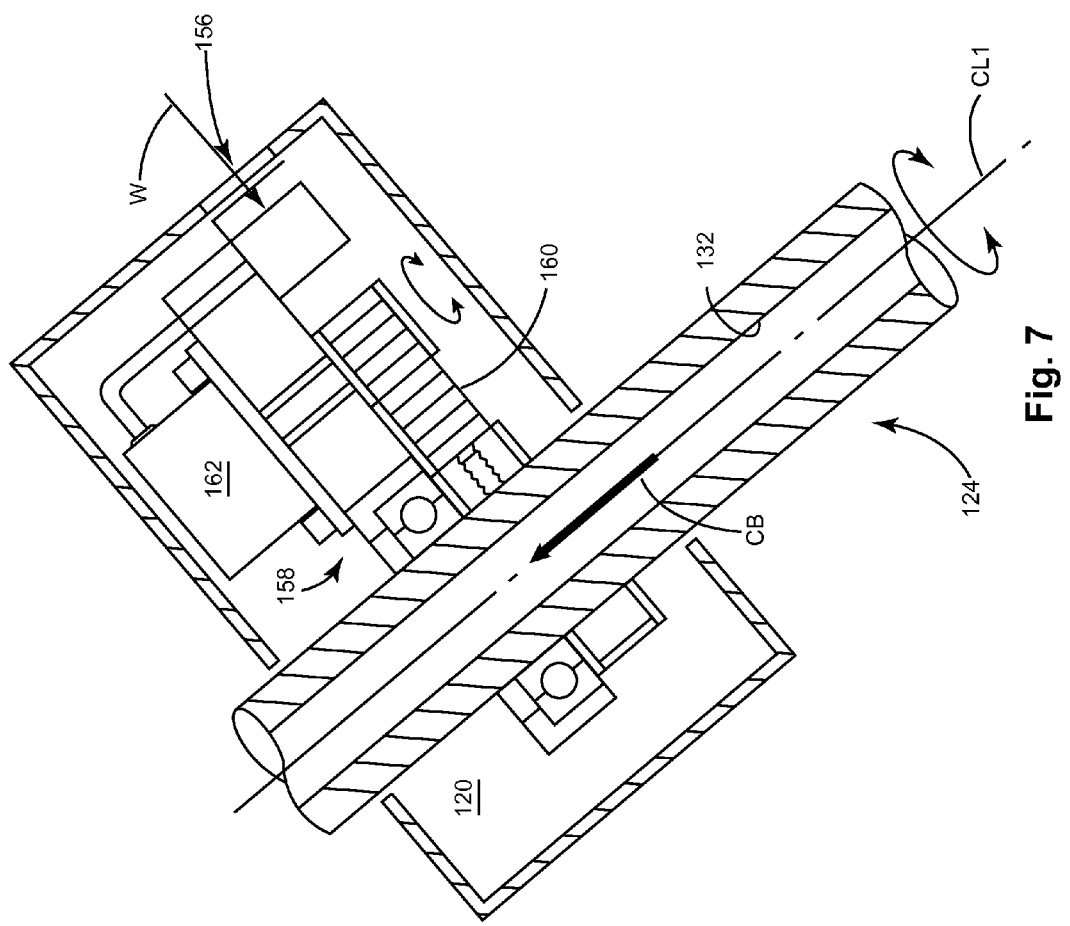
FIG. 7 is a partial sectional view of an example of a solar tracking system.

As illustrated in FIG. 7, a solar tracking system 156 determines the optimum positions of the rotatable first tubular member 124 and the solar light concentrator 136 to most-effectively capture the available sun light during the daylight hours. Solar tracking systems are well-known in the art and therefore will not be described in detail herein. The tracking system 156 may incorporate a "polar" mount and control a single-axis rotational drive system 158 disposed between the first tubular member 124 and the rigid support member 106 or the structure 100.

Taking commands from the solar tracking system 156, is an exemplary rotational drive system 158 that includes a drive line 160 such as a gear drive, a chain drive, or a belt drive for interacting with sprockets or gears to provide accurate angular orientation. Attached to the drive line 160 is a powering device 162, such as an electric stepper motor, for rotating the first tubular member 124 and solar light concentrator 136 in unison about the central, longitudinal axis (CL1), thus tracking the Sun (S) during the daylight hours. The solar tracking system 156 may, itself, be solar powered using photovoltaic panels that covert sunlight into DC voltage.

Figure 8:
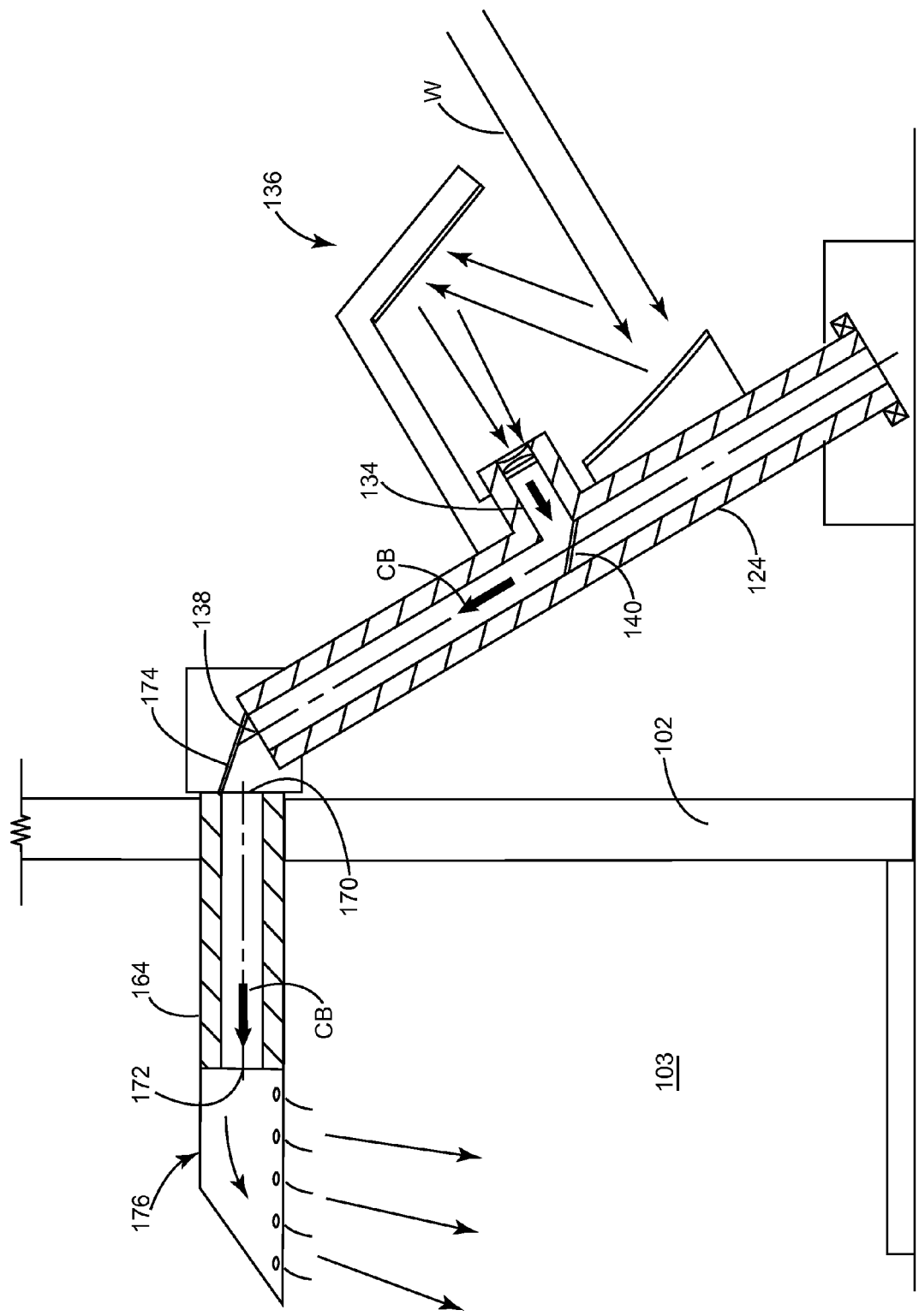
FIG. 8 is a partial sectional view of an example of a first tubular member and a second tubular member.

In the example of FIG. 2, the light exiting the first light delivery port 138 directly enters the structure 100 through an overhang, a side wall, a ceiling, a window, a roof, or a floor. In the example of FIGS. 1 and 8, the light exiting the first light delivery port 138 is further directed by a second tubular member 164 before entering the interior 103 of the structure 100. In this example, the second tubular member 164 interacts with, and is optically coupled to, the first tubular member 124 at the first light delivery port 138. The juncture between the first tubular member 124 and the second tubular member 138 includes a connector that enables the first tubular member 124 to rotate independent of the second tubular member 138. The juncture may include a slip joint connector, a gimbal connector, a bearing connector, or other connector that allows rotation of the first tubular member 124 in relation to the second tubular member 138.

The second tubular member 164 extends lengthwise along a central, longitudinally extending, axis (CL2). A second support wall 166 defines a second light transfer duct 168, and at least two apertures that are optically coupled to the second light transfer duct 168. A second light receiving port 170 receives collimated light from the first light delivery port 138 and reflects it to the second light transfer duct 168. A second light delivery port 172 receives collimated light from the second light transfer duct 168. The design and manufacture of the second tubular member 164 is similar to the first tubular member 124 and the inner surface 132 is similarly reflective.

Figure 9:
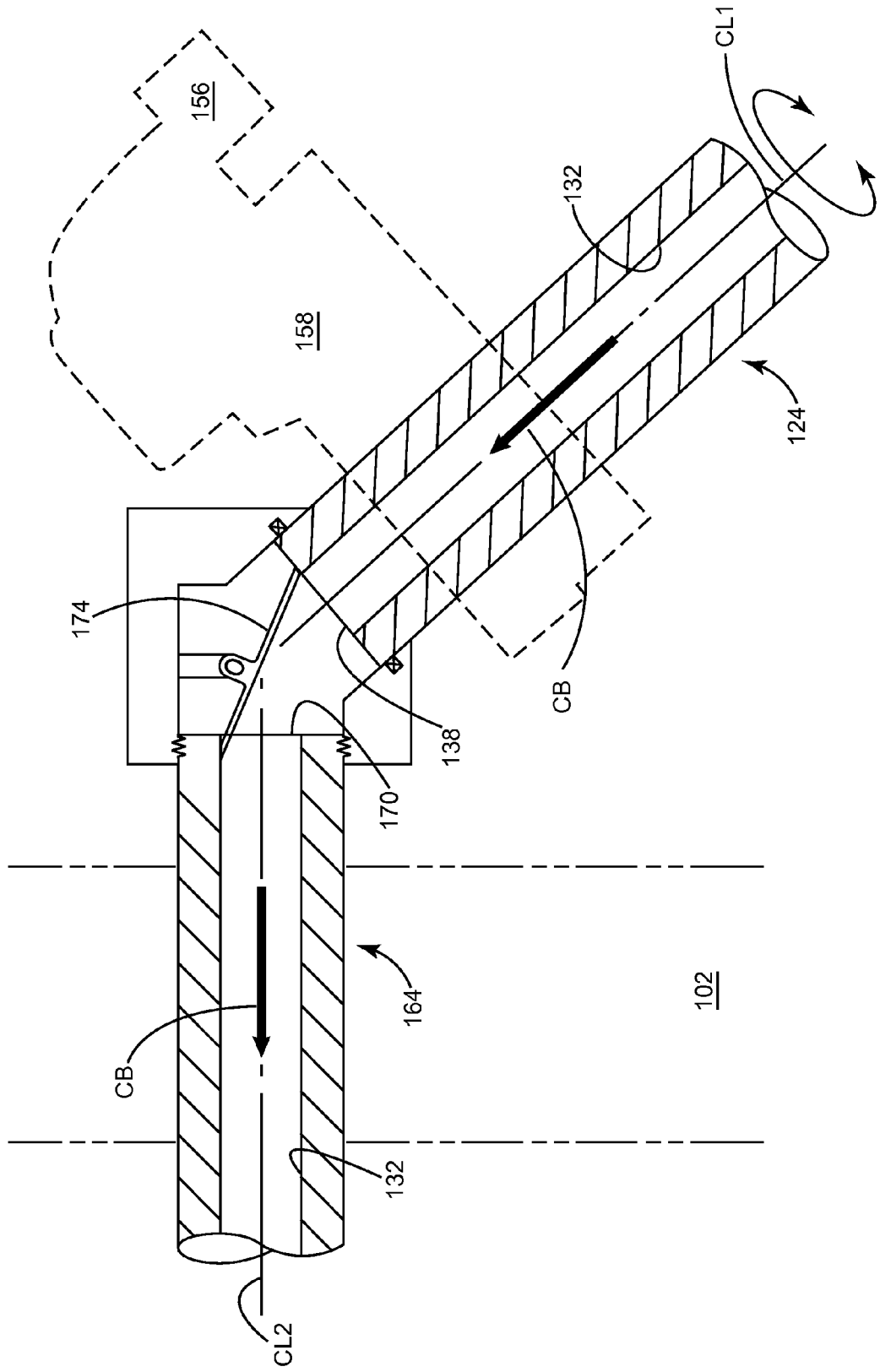
FIG. 9 is a detailed view of the first tubular member and a second tubular member of FIG. 8.

A second turning reflector 174 is disposed inside of the second light transfer duct 168 and is located proximate to the second light receiving port 172 as illustrated in FIG. 9. The second turning reflector 174 is rigidly or adjustably mounted to the second tubular member 164 to allow for angular adjustments to the central, longitudinal axis (CL2). The second turning reflector 174 receives the collimated light beam (CB) from the second light delivery port 172 and directs the collimated light beam (CB) down the second light transfer duct approximately parallel to the central, longitudinal axis (CL2). The collimated light beam (CB) travels the length of the second light transfer duct 168 to the second light delivery port 172. The design and manufacture of the second turning reflector 174 is similar to the first turning reflector 140.

Figure 10:
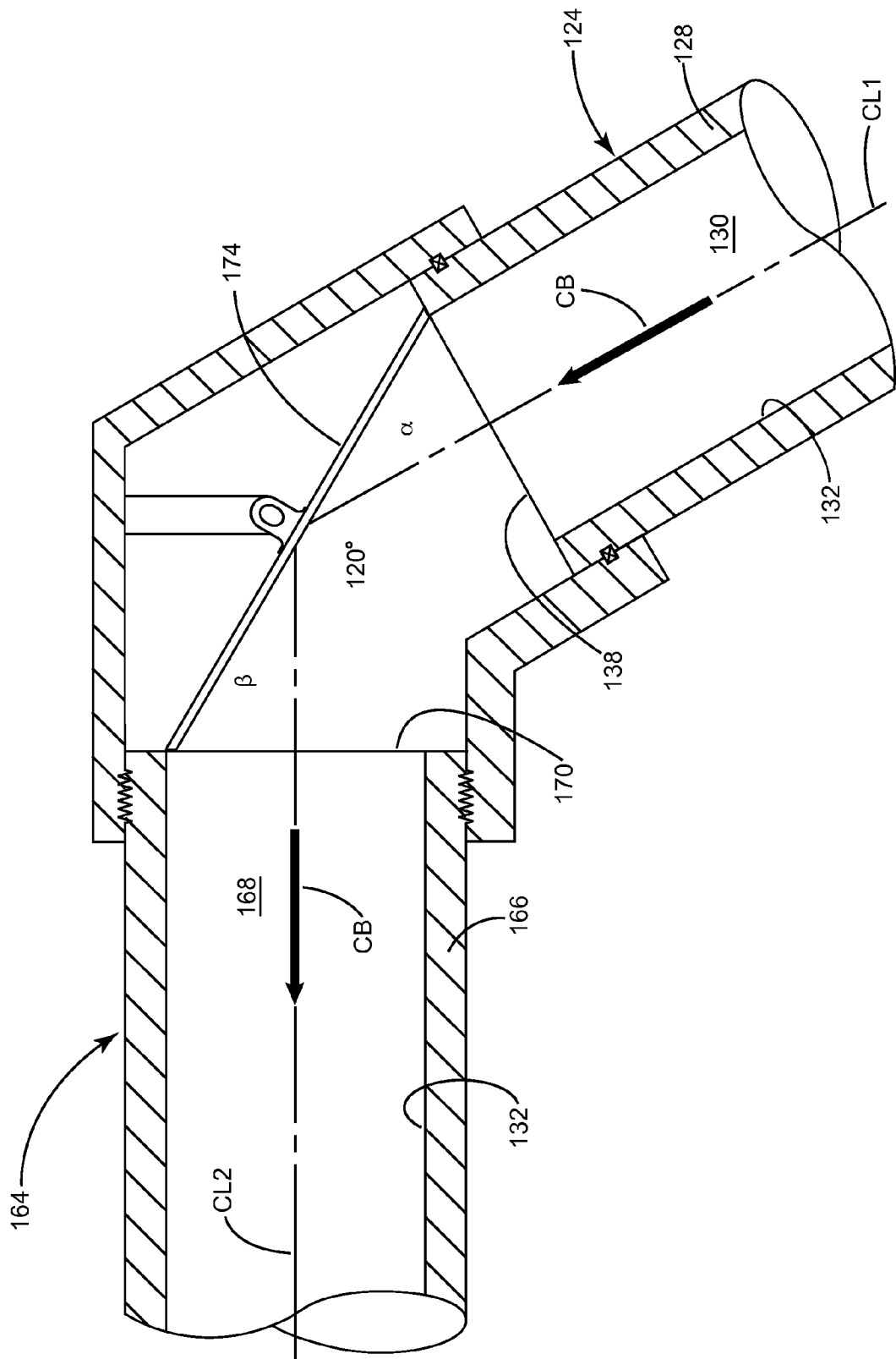
FIG. 10 is a detailed view of a second turning reflector where the first tubular member and the second tubular members meet at an angle of 120 degrees.

In the example of FIG. 10, the collimated light beam (CB) is directed out of the first tubular member 124, approximately parallel to the central, longitudinal axis (CL1), and is reflected by the second turning reflector 174 into the second tubular member 164, approximately parallel to the central, longitudinal axis (CL2). In this example, the second turning reflector 174 is affixed to the second tubular member 164 at the juncture of the first tubular member 124 and the second tubular member 164 and at an included angle of approximately 120 degrees. The law of reflection states that the angle of incidence equals the angle of reflectance. In this example, the second turning reflector 174 is positioned at an angle $\alpha$ of approximately 30 degrees to the incoming collimated light source along the central, longitudinal axis (CL1) and at an angle $\beta$ of approximately 30 degrees to the central, longitudinal axis (CL2).

Figure 11:
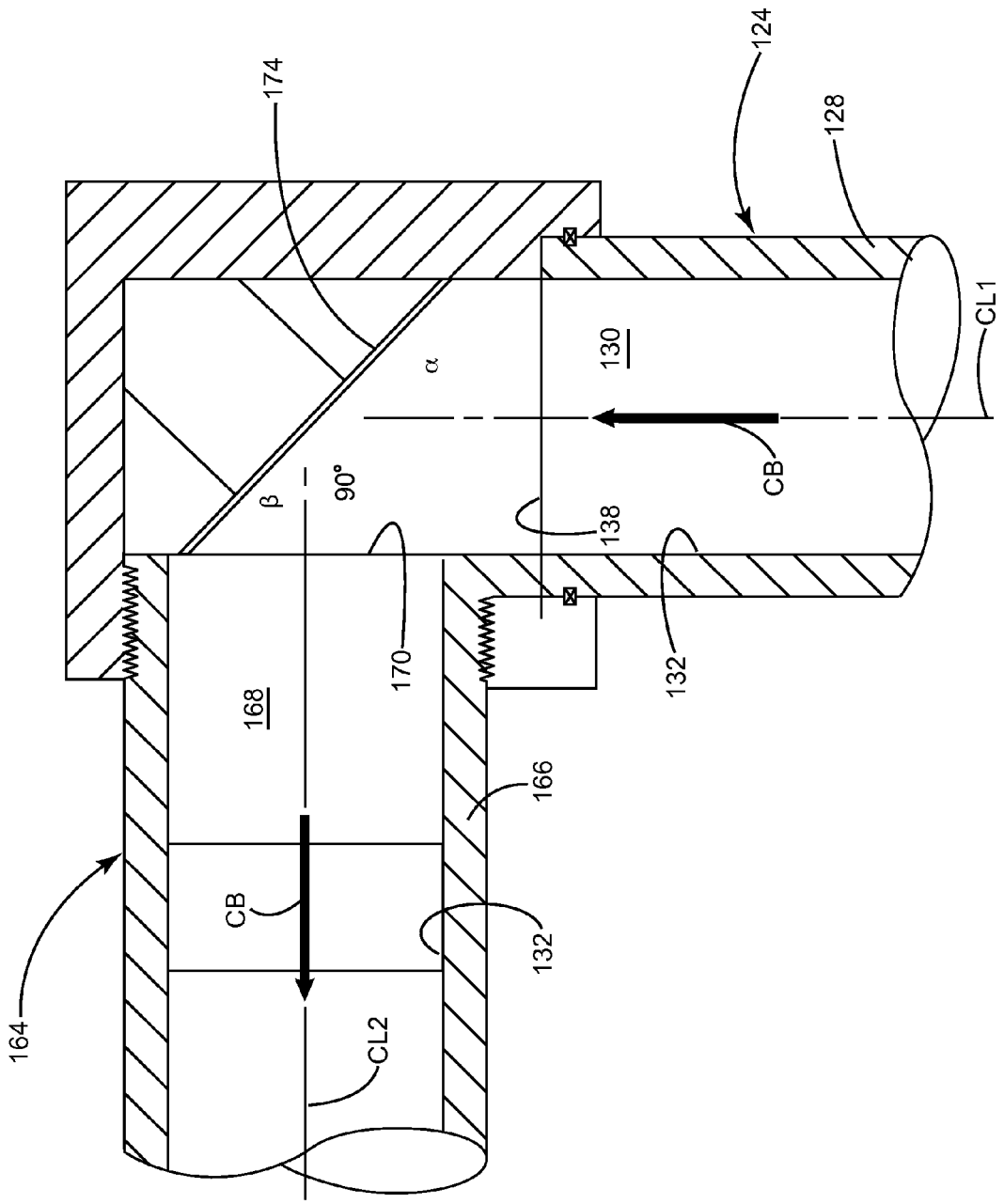
FIG. 11 is a detailed view of a second turning reflector where the first tubular member and the second tubular members meet at an angle of 90 degrees.

In another example of FIG. 11, the first tubular member 124 is joined to the second tubular member 164 at an included angle of approximately 90 degrees. Here, the second turning reflector 174 is positioned at an angle $\alpha$ of approximately 45 degrees to the incoming collimated light source approximately parallel to the central, longitudinal axis (CL1) and at an angle $\beta$ of approximately 45 degrees to the central, longitudinal axis (CL2). With these angular configurations and others contemplated, the solar lighting apparatus 104 can be adapted to deliver solar light to many different shapes, sizes and styles of structures 100.

Figure 12:
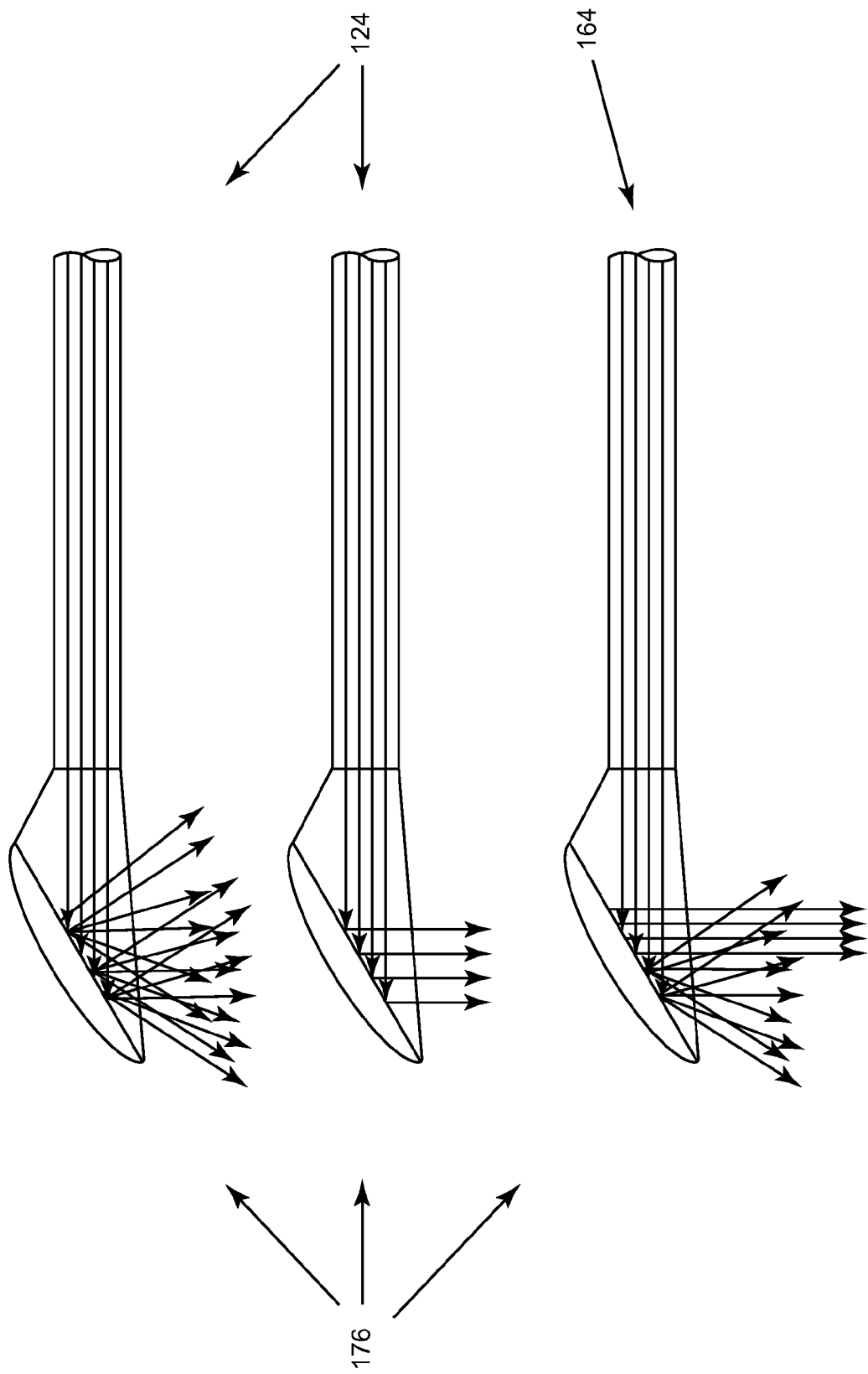
FIG. 12 illustrates several examples of luminaires.

Once the light is delivered inside the structure 100, it may be distributed about the interior 103 by one or more luminaires 176. The luminaires 176 are interchangeable and adjustable to adapt to different illumination needs. For example, as shown in FIG. 12, the luminaires 176 may be constructed from opaque diffuse materials such as glass or plastic, translucent scattering materials, specularly reflecting planar surfaces such as mirrors, specularly reflecting curved surfaces, specular or diffuse reflecting louvers that may be positioned to steer the light or any combination of these types of surfaces.

Diffuse lighting may be useful for general illumination, while specularly reflected light may permit higher intensity task lighting such as for over a workstation. It is also envisioned that some luminaires 176 may be constructed as a hybrid configuration to direct a portion of the collimated light beam (CB) for use as general illumination and a portion for use as task lighting. The solar lighting apparatus 104 will provide light to the interior 103 of the structure 100 during the daytime hours, using renewable energy sources, and releasing no carbon dioxide emissions into the atmosphere.

Figure 13:
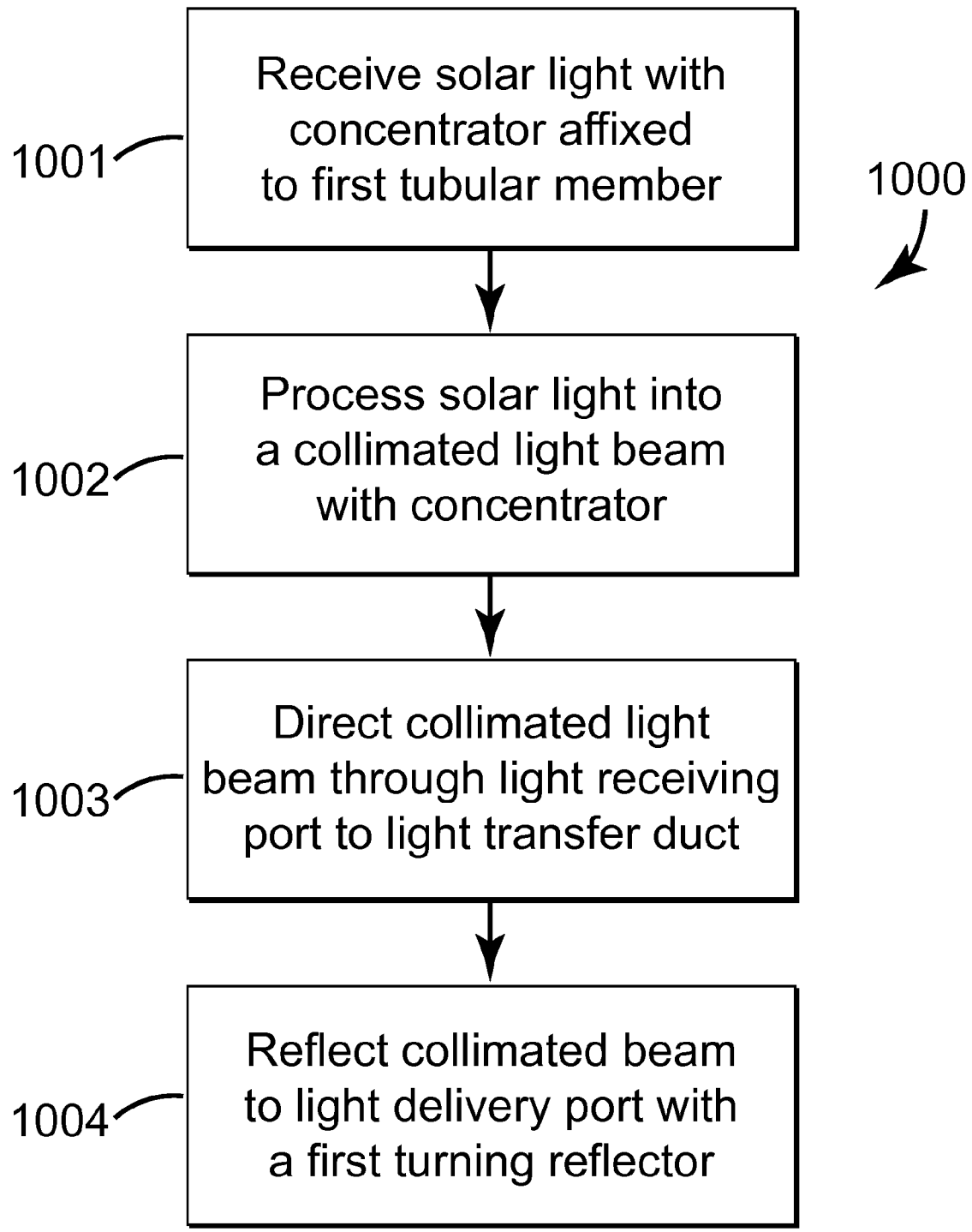
FIG. 13 illustrates the method steps for distributing solar light to a structure.

FIG. 13 schematically illustrates a method 1000 having a series of steps that, when executed, distributes solar light to the interior 103 of a structure 100. In a first step designated as 1001, a solar light concentrator 136, which is affixed to a first tubular member 124, receives solar light waves (W) from the sun (S). In a second step designated 1002, the solar light concentrator 136 processes the solar light waves (W) into a collimated light beam (CB). In a third step designated 1003, the collimated light beam is directed through a first light receiving port 134 and into a first light transfer duct 130, which are defined by the first tubular member 124 extending lengthwise along a central, longitudinal axis (CL1). In the fourth step designated 1004, a first turning reflector 140, disposed in the first light transfer duct 130 and proximate to the first light receiving port 134, reflects the collimated light beam (CB) down the first light transfer duct 130 and approximately parallel to the central, longitudinal axis (CL1) to a first light delivery port 138.

In other examples, the solar light concentrator 136 and first tubular member 124 are rotated about the longitudinal axis (CL1) with a solar tracking system 156. In some examples, the solar tracking system 156 is closed loop and in other examples, the solar tracking system 156 is open loop.

In other examples of the processing step, the solar light concentrator 136 functions by reflecting ambient solar light waves (W) with a primary reflector 142 having a reflecting surface that is defined by a segment of a parent paraboloid. The primary reflector 142 being aspherical and having an off-axis configuration with an optical axis located at or near an edge of the primary reflector 142, and reflecting the reflected solar light with a secondary reflector 144 positioned adjacent to the primary reflector 142, and then collimating the reflected solar light with a collimating lens 146.

In another example, the reflecting step also includes reflecting the solar light, with a second turning reflector 174 disposed proximate to the first light delivery port 138, through a second light receiving port 170 and down a second light transfer duct 168 approximately parallel to a central, longitudinal axis (CL2). In this example, the second light transfer duct 168 is defined by a second tubular member 164 that is connected to the first tubular member 124 at a juncture located at the first light delivery port 138.

In other examples, the step of distributing the solar light from the first light delivery port 138 is done with an interchangeably attached luminaire 176. In some examples, the luminaire 176 distributes diffuse light. In other examples, the luminaire 176 distributes specularly reflected light. And in yet other examples, the luminaire 176 distributes both diffuse and specularly reflected light.

While this disclosure describes and enables several examples of solar light distribution systems, apparatuses, and methods of distributing solar light, other examples and applications are contemplated. Accordingly, the invention is intended to embrace those alternatives, modifications, equivalents, and variations as fall within the broad scope of the appended claims. The technology disclosed and claimed herein may be available for licensing in specific fields of use by the assignee of record.

What is claimed is:

1. A solar light distribution system comprising:
   a first tubular member extending lengthwise along a central, longitudinal axis (CL1), said first tubular member having a first support wall defining a first light transfer duct, a first light receiving port, and a first light delivery port that are all optically coupled;
   a solar light concentrator affixed externally to said first tubular member and located proximate to the first light receiving port, said light concentrator for receiving solar light waves, processing the solar light waves into a collimated light beam, and directing the collimated light beam through the first light receiving port and into the first light transfer duct;
   a first turning reflector disposed inside of the first light transfer duct and located proximate to the first light receiving port, said first turning reflector for reflecting the collimated light beam from the light receiving port, down the first light transfer duct, approximately parallel to the central, longitudinal axis (CL1), to the first light delivery port; and wherein said solar light concentrator further includes
   a primary reflector having a reflecting surface that is defined by a segment of a parent paraboloid, said primary reflector being aspherical and having an off-axis configuration with an optical axis located at or near an edge of said primary reflector;
   a secondary reflector positioned adjacent to said primary reflector to receive solar light reflected by said primary reflector; and
   a collimating lens located adjacent to said secondary reflector for receiving solar light reflected by said secondary reflector.

2. The apparatus of claim 1 and further comprising:
   a sun tracking device affixed to said first tubular member for rotating said first tubular member about the central, longitudinal axis (CL1) to optimize the receiving of solar light by said concentrator.

3. The apparatus of claim 2 wherein said sun tracking device is a closed-loop sun tracking device.

4. The apparatus of claim 2 wherein said sun tracking device is an open-loop sun tracking device.

5. The apparatus of claim 1 wherein said first tubular member support wall comprises an inner surface that is reflective.

6. The apparatus of claim 1 and further comprising a light distribution luminaire interchangeably attached to the first light distribution port.

7. The apparatus of claim 6 wherein said light distribution luminaire distributes diffuse light.

8. The apparatus of claim 6 wherein said light distribution luminaire distributes specularly reflected light.

9. The apparatus of claim 6 wherein said light distribution luminaire distributes both diffuse light and specularly reflected light.

10. A solar light distribution system comprising:
    a first tubular member extending lengthwise along a central, longitudinal axis (CL1), said first tubular member having a first support wall defining a first light transfer duct, a first light receiving port, and a first light delivery port that are all optically coupled;
    a solar light concentrator affixed externally to said first tubular member and located proximate to the first light receiving port, said light concentrator for receiving solar light waves, processing the solar light waves into a collimated light beam, and directing the collimated light beam through the first light receiving port and into the first light transfer duct;
    a first turning reflector disposed inside the first light transfer duct and located proximate to the first light receiving port, said first turning reflector for reflecting the collimated light beam from the light receiving port, down the first light transfer duct, approximately parallel to the central, longitudinal axis (CL1), to the first light delivery port;
    a second tubular member extending lengthwise along a central, longitudinal, axis (CL2), said second tubular member having a second support wall defining a second light transfer duct, a second light receiving port, and a second light delivery port that are all optically coupled, said second tubular member at the second light receiving port being joined at a juncture to said first tubular member at the first light delivery port;
    a second turning reflector disposed proximate to the juncture of said second tubular member and said first tubular member, said second turning reflector for reflecting the collimated light beam from the second light receiving port, down the second light transfer duct and approximately parallel to the central, longitudinal axis (CL2), to the second light delivery port; and wherein said solar light concentrator further includes a primary reflector having a reflecting surface that is defined by a segment of a parent paraboloid, said primary reflector being as aspherical and having an off-axis configuration with an optical axis located at or near an edge of said primary reflector;

a secondary reflector positioned adjacent to said primary reflector to receive solar light reflected by said primary reflector; and a collimating lens located adjacent to said secondary reflector for receiving solar light reflected by said secondary reflector.

11. The apparatus of claim 10 and further comprising:
a solar tracking system affixed to said first tubular member for rotating said first tubular member about the central, longitudinal axis (CL1) to optimize the receiving of solar light by said concentrator.

12. The apparatus of claim 11 wherein said solar tracking system is closed loop.

13. The apparatus of claim 11 wherein said sun tracking device is open loop.

14. The apparatus of claim 10 wherein said first and second tubular member support walls comprise inner surfaces that is reflective.

15. The apparatus of claim 10 and further comprising a light distribution luminaire interchangeably attached to the second light distribution port.

16. The apparatus of claim 15 wherein said light distribution luminaire distributes diffuse light.

17. The apparatus of claim 15 wherein said light distribution luminaire distributes specularly reflected light.

18. The apparatus of claim 15 wherein said light distribution luminaire distributes both diffuse light and specularly reflected light.

19. A method of distributing solar light to a structure comprising the steps of:

a. receiving solar light with a concentrator affixed externally to a first tubular member extending lengthwise along a central, longitudinal axis (CL1);

b. processing the solar light into a collimated light beam with the concentrator by reflecting ambient solar light with a primary reflector having a reflecting surface that is defined by a segment of a parent paraboloid, the primary reflector being aspherical and having an off-axis configuration with an optical axis located at or near an edge of said primary reflector, and reflecting the reflected solar light with a secondary reflector positioned adjacent to the primary reflector, and collimating the reflected solar light with a collimating lens;

c. directing the collimated light beam through a first light receiving port and into a first light transfer duct defined by the first tubular member; and d. reflecting the collimated light beam, with a first turning reflector disposed in the first internal light duct and proximate to the first light receiving port, down the first light transfer duct, approximately parallel to the central, longitudinal axis (CL1) to a first light delivery port.

20. The method of claim 19 and further comprising the step of:

e. rotating the concentrator and first tubular member with a sun tracking device about the longitudinal axis (CL1).

21. The method of claim 20 wherein the sun tracking device is a closed loop sun tracking device.

22. The method of claim 20 wherein the sun tracking device is an open loop sun tracking device.

23. The method of claim 19 wherein the reflecting step (d) further comprises reflecting the solar light with a second turning reflector disposed proximate to a second light receiving port, down a second light transfer duct approximately parallel to a central, longitudinal axis (CL2) to a second light distribution port, the second receiving port, second light transfer duct, and second delivery port defined by a second tubular member that is joined at a juncture to the first tubular member at the first light delivery port.

24. The method of claim 19 and further comprising the step of (e) distributing the solar light from the first light delivery port with an interchangeably attached luminaire.

25. The method of claim 24 wherein the luminaire distributes diffuse light.

26. The method of claim 24 wherein the luminaire distributes specularly reflected light.

27. The method of claim 24 wherein the luminaire distributes both diffuse and specularly reflected light.

\* \* \* \* \*